(12) United States Patent
Groux et al.

(10) Patent No.: US 8,842,680 B2
(45) Date of Patent: Sep. 23, 2014

(54) METHOD OF MAINTAINING DATA COLLECTIONS IN A MOBILE COMMUNICATION DEVICE

(75) Inventors: Brian Roy Groux, Hamilton (CA); Christopher James Runstedler, Waterloo (CA); Rohit Rocky Jain, Waterloo (CA)

(73) Assignee: BlackBerry Limited, Waterloo (CA)

( * ) Notice: Subject to any disclaimer, the term of this patent is extended or adjusted under 35 U.S.C. 154(b) by 773 days.

(21) Appl. No.: 12/770,956

(22) Filed: Apr. 30, 2010

(65) Prior Publication Data
US 2010/0278162 A1 Nov. 4, 2010

Related U.S. Application Data

(60) Provisional application No. 61/174,157, filed on Apr. 30, 2009.

(51) Int. Cl.
*H04L 12/28* (2006.01)
*H04L 29/08* (2006.01)
*H04L 12/56* (2006.01)

(52) U.S. Cl.
CPC ............ *H04L 67/16* (2013.01); *H04L 67/1095* (2013.01); *H01W 8/18* (2013.01)
USPC .......................................... 370/400; 370/411

(58) Field of Classification Search
None
See application file for complete search history.

(56) References Cited

U.S. PATENT DOCUMENTS 5,857,201 A * 1/1999 Wright et al. .......................... 1/1
6,785,721 B1 * 8/2004 Immerman et al. ........... 709/220
2004/0155909 A1 * 8/2004 Wagner .......................... 345/854
2005/0097225 A1 * 5/2005 Glatt et al. ..................... 709/248
2007/0198662 A1 * 8/2007 Parham et al. ................. 709/219
2007/0283011 A1 * 12/2007 Rakowski et al. ............ 709/225
2008/0005697 A1 * 1/2008 Jung .............................. 715/825

(Continued)

FOREIGN PATENT DOCUMENTS

EP 1775924 4/2007

OTHER PUBLICATIONS

Dr. Bhaskaran Raman, CS698T—Wireless Networking: Principles and Practice; Lecture No. 22; Sep. 27, 2005 found at http://www.cse.iitk.ac.in/users/cs698t/Lecture_notes/lec22-2.pdf.
Extended European Search Report dated Sep. 3, 2010.

*Primary Examiner* — Eunsook Choi
(74) *Attorney, Agent, or Firm* — Ridout & Maybee LLP

(57) ABSTRACT

A mobile device configured to communicate with one or more various enterprise services and Internet services. Such services include such features as e-mail, calendar, and personal information management (PIM). The mobile device is configured to maintain a distinction between each of these services by having a number of databases, each database dedicated to a specific service. To facilitate this distinction, a service identifier is generated with respect to each database. When a service is removed, the mobile device no longer has access to the service. In such an instance, the mobile device is configured to maintain the associated database and the service identifier. Should a removed service become reactivated for the mobile device, the maintained database will become re-associated with the proper service by using the service identifier. By distinguishing between databases using the service identifiers, the mobile device may prevent "cross-pollination" between its databases when synchronizing with different services.

23 Claims, 4 Drawing Sheets

(56) References Cited

U.S. PATENT DOCUMENTS

| | | |
|---|---|---|
| 2008/0026729 A1 | 1/2008 | May et al. |
| 2009/0077136 A1* | 3/2009 | Igawa et al. .................. 707/200 |
| 2009/0089342 A1 | 4/2009 | Runstedler et al. |
| 2009/0089866 A1* | 4/2009 | Yato et al. ........................ 726/6 |
| 2009/0122982 A1* | 5/2009 | Abrams et al. .................. 380/45 |
| 2009/0259744 A1* | 10/2009 | Kolke et al. .................... 709/224 |
| 2010/0100590 A1* | 4/2010 | Palay et al. .................... 709/203 |
| 2010/0257229 A1* | 10/2010 | Bolohan et al. ............... 709/203 |

* cited by examiner

METHOD OF MAINTAINING DATA COLLECTIONS IN A MOBILE COMMUNICATION DEVICE

CROSS REFERENCE TO RELATED APPLICATIONS

This application claims the benefit of and priority to: U.S. provisional patent application Ser. No. 61/174,157 filed Apr. 30, 2009, the contents of which are incorporated herein by reference.

TECHNICAL FIELD

Example embodiments described herein generally relate to management of data items, and in particular to maintaining of data collections within a mobile communication device.

BACKGROUND

Some mobile communication devices include personal information which is synchronized with a server or service, for example an enterprise server. Typically, such personal information is stored in memory or other storage within a single database in the mobile device. This is especially the case when personal information is stored within handheld mobile devices having limited resources and functionality. Difficulties may arise should the mobile device be associated with another server or service, for example an Internet service (e.g., web-based e-mail application). For example, mixing or "cross-pollination" of personal information from separate services could occur, which may be undesired. As an example, information related to a personal address book on a third party Internet service may be inadvertently mixed with similar types of information from a user's enterprise (company) server while synchronizing.

In some instances, it has been recommended that all of the personal information within a mobile device corresponding to a first service be deleted prior to joining another service. Such a procedure is a cumbersome and brute-force method of preventing cross-pollination of information between separate services.

Other difficulties may occur when a user unsubscribes or disassociates from one of these services, or the user deactivates a service temporarily without intending to completely disassociate from the service. A user may wish to later reactivate or restore that service. In some systems, reactivating a service results in the device once again synchronizing the personal information data from the service, with the mobile device having to download again all of the personal information over a wireless network. Such a process may require intensive or increased traffic over a wireless network, which is generally not desired.

As an example, a mobile device may activate against Service A; disassociate with Service A; and activate against Service B. However, the existing data items from Service A may erroneously be synchronized to Service B. Additional difficulties may arise when Service A is reactivated.

Thus, it would be advantageous to provide a system which addresses some of these difficulties.

BRIEF DESCRIPTION OF THE DRAWINGS

Like reference numerals are used in the drawings to denote like elements and features.

DETAILED DESCRIPTION OF EXAMPLE EMBODIMENTS

Example embodiments described herein relate to the activation of remote services such as enterprise services and Internet services, and associated communications between a mobile device and one or more such services. Such services include such features as e-mail, calendar, and personal information management (PIM). Typically, in order to activate such services, the server authenticates or accepts a mobile device for activation, and in turn sends service records to the mobile device specific to implementing the desired features of the services. During normal operation, information such as PIM is synchronized between the mobile device and the service.

In some example embodiments, the mobile device is configured to maintain a distinction between each of these services by having a number of databases, each database dedicated to a specific service. To facilitate this distinction, a service identifier (SID) is generated with respect to each database. In some cases, the service identifier contains information relating to both the service and the mobile device.

When a service is removed, this means that the mobile device no longer has access to the service, and in turn the mobile device typically deletes the stored service records. However, in example embodiments the mobile device is configured to maintain the associated database and the generated service identifier. Thus, should the service be reactivated on the mobile device, the maintained database will become re-associated with the service by using the service identifier. Since the database has been maintained within the mobile device, synchronization of all data items may not be required, and only those data items which have changed since removal of the service need be synchronized, if desired.

It can be appreciated that by distinguishing between databases using the SIDs, the mobile device may prevent "cross-pollination" between the databases relating to different services, for example when synchronizing occurs with different services attempting to synchronize similar types of data items. For example, if a deactivated service becomes reactivated, only the proper desired database will be associated with that service. This is in contrast to some past systems wherein reactivation of a service results in synchronization with whatever database is resident on the mobile device, which is typically a single database, which may result in undesired cross-pollination if the single database has been associated with another service.

In another example embodiment, when a service is removed or deactivated, this may result in the service deleting the synchronized database resident on the service. Thus, the database stored within the mobile device may be the only remaining data collection relating to the data items contained therein. When the service is reactivated, the mobile device may re-synchronize with the service to send those data items which were maintained within the database of the mobile device.

Figure 1:
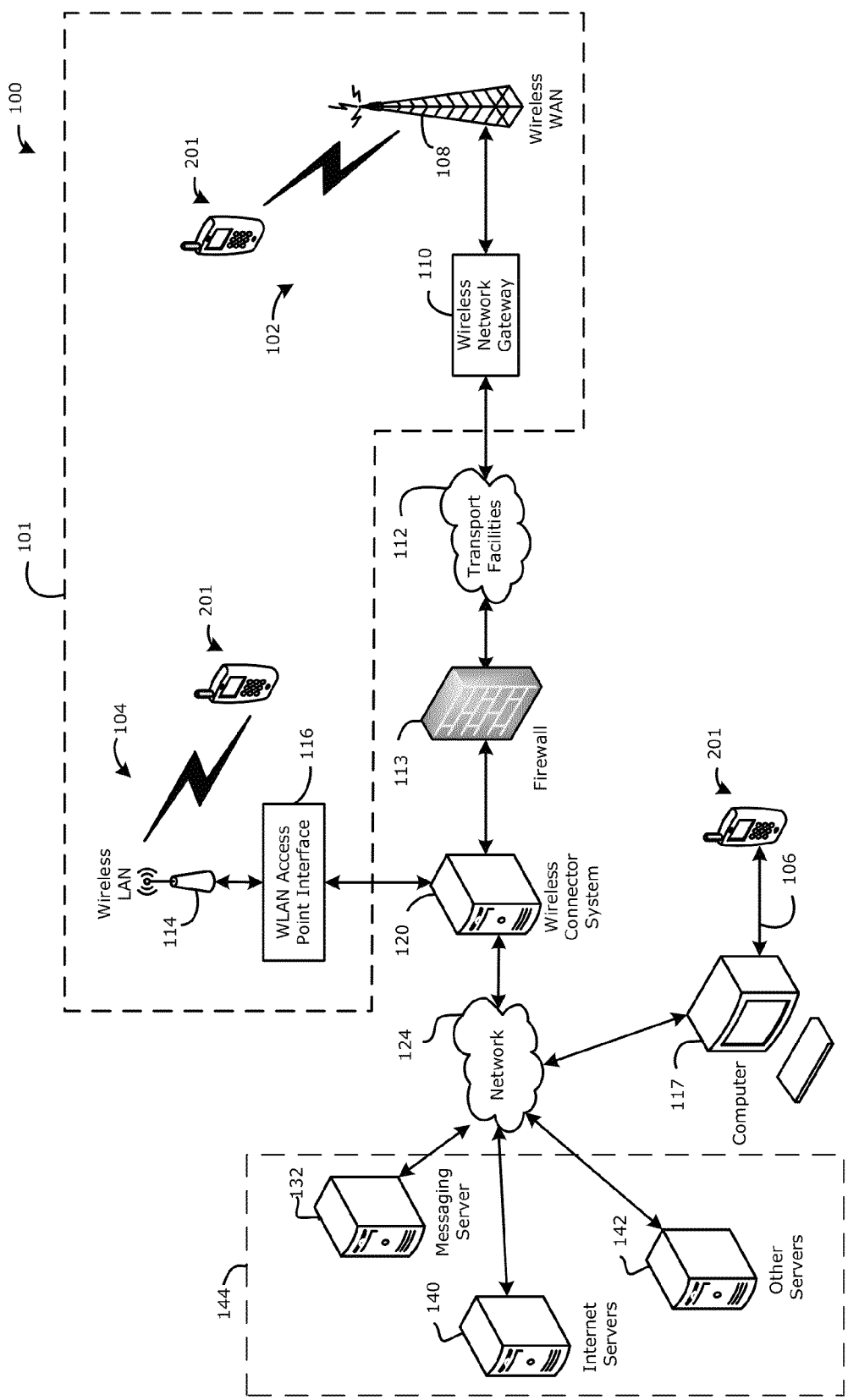
FIG. 1 shows a block diagram illustrating a communication system including remote services to which example embodiments can be applied.

Reference is made to FIG. 1 which shows in block diagram form a communication system 100 in which example embodiments according to the present disclosure may be applied. The communication system 100 comprises a number of mobile communication devices ("mobile devices") 201 which may be connected to the remainder of system 100 in any of several different ways. Accordingly, several instances of mobile devices 201 are depicted in FIG. 1 as employing different example ways of connecting to system 100. Mobile devices 201 are connected to a wireless communication network 101 which may comprise one or more of a Wireless Wide Area Network (WWAN) 102, a Wireless Local Area Network (WLAN) 104, or any other suitable network arrangements. In some embodiments, the mobile devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of base stations 108 (one of which is shown in FIG. 1), each containing radio transmitting and receiving equipment adapted to provide wireless radio-frequency (RF) network service or "coverage" to a corresponding area or cell. The WWAN 102 is typically operated by a mobile network service provider that provides subscription packages to users of the mobile devices 201. The WWAN 102 may be implemented as any appropriate wireless network, including but not limited to any to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"). Other network types and technologies could also be used. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

A wireless network gateway 110 may be associated with the WWAN 102 to connect the mobile devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realized using the Internet rather than an internal or enterprise network.

The wireless network gateway 110 provides an interface between the wireless connector system 120 and the WWAN 102, which facilitates communication between the mobile devices 201 and other devices (not shown) connected, directly or indirectly, to the WWAN 102. Accordingly, communications sent via the mobile devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile devices 201.

The WLAN 104 comprises a wireless network which, in some embodiments, conforms to IEEE 802.11x standards (sometimes referred to as Wi-Fi) such as, for example, any or all of the IEEE 802.11a, 802.11b, 802.11g, or 802.11n standards. Other communication protocols may be used for the WLAN 104 in other embodiments such as, for example, IEEE 802.16e (also referred to as Worldwide Interoperability for Microwave Access or "WIMAX"), or IEEE 802.20 (also referred to as Mobile Wireless Broadband Access). The WLAN 104 includes one or more wireless RF Access Points (AP) 114 (one of which is shown in FIG. 1) that collectively provide WLAN service or "coverage" over an area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including e-mail messages, to and from a set of managed mobile devices 201. The wireless connector system 120 also provides administrative control and management capabilities over users and mobile devices 201 which may connect to the wireless connector system 120.

The wireless connector system 120 typically provides a secure exchange of data (e.g., e-mail messages, personal information manager (PIM) data, and IM data) with the mobile devices 201. In some embodiments, communications between the wireless connector system 120 and the mobile devices 201 are encrypted.

The network 124 may comprise a private local area network, metropolitan area network, wide area network, the public internet or combinations thereof and may include virtual networks constructed using any of these, alone, or in combination.

A mobile device 201 may alternatively connect to the wireless connector system 120 using a computer 117, such as desktop or notebook computer, via the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, a conventional serial protocol, or any other appropriate data connection, via respective ports or interfaces of the mobile device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1, sometimes referred to as "BLUETOOTH", or IEEE 802.15.3a, also referred to as UltraWideband (UWB), or any other appropriate PAN connection.

It will be appreciated that the above-described communication system is provided for the purpose of illustration only, and that the above-described communication system comprises one possible communication network configuration of a multitude of possible configurations for use with the mobile devices 201. The teachings herein may be employed in connection with any other type of network and associated devices that are effective in implementing or facilitating wireless communication. Suitable variations of the communication system will be understood to a person of skill in the art.

Figure 2:
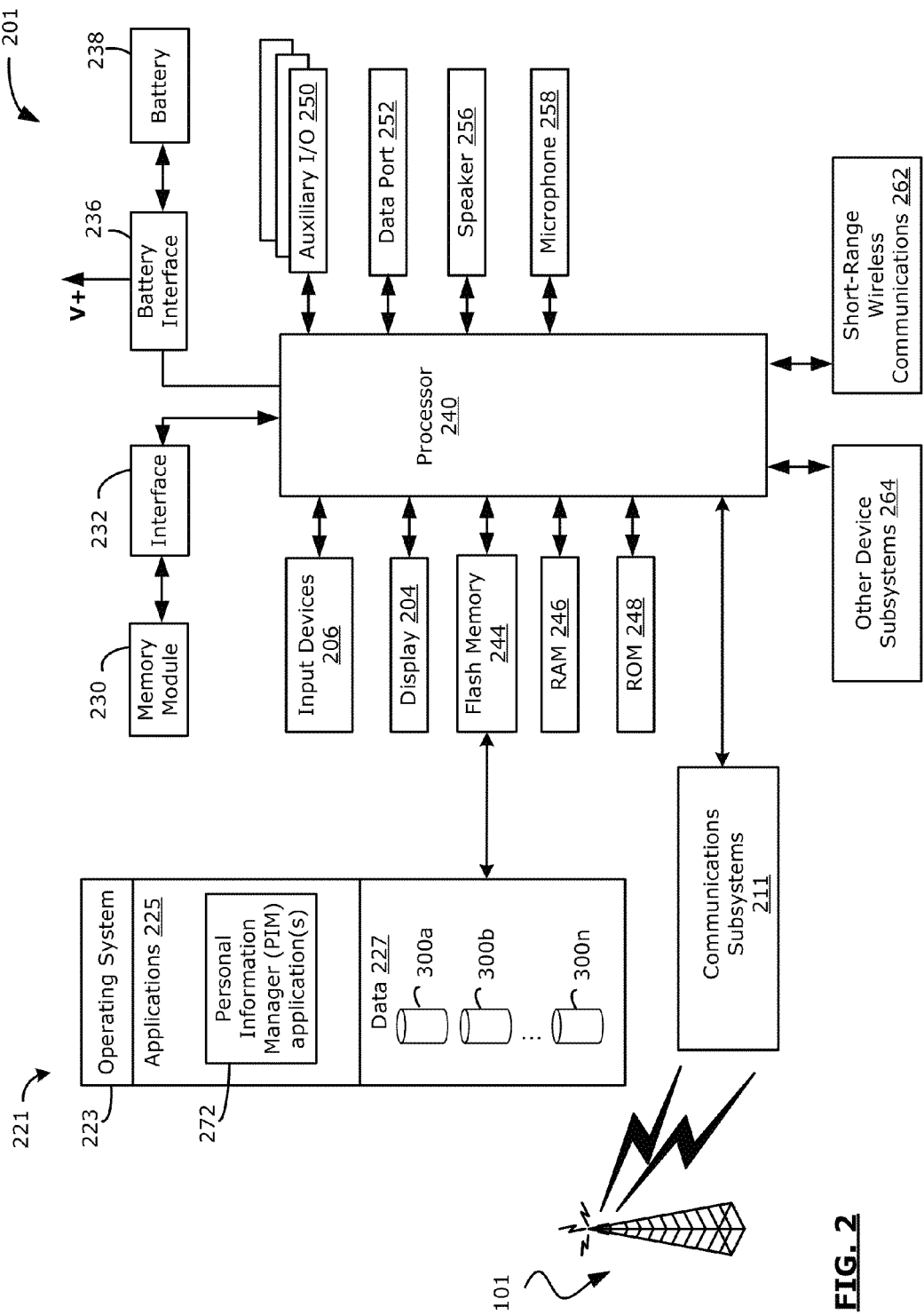
FIG. 2 shows a block diagram illustrating a mobile communication device in accordance with an example embodiment.

Reference is now made to FIG. 2 which illustrates a mobile device 201 in which example embodiments can be applied. The mobile device 201 is a two-way communication device having data and voice communication capabilities, and the capability to communicate with other computer systems, for example, via the Internet. Depending on the functionality provided by the mobile device 201, in various embodiments the mobile device 201 may be a handheld device, a multiple-mode communication device configured for both data and voice communication, a smartphone, a mobile telephone or a PDA (personal digital assistant) enabled for wireless communication.

The mobile device 201 includes a rigid case (not shown) housing the components of the mobile device 201. The internal components of the mobile device 201 may, for example, be constructed on a printed circuit board (PCB). The description of the mobile device 201 herein mentions a number of specific components and subsystems. Although these components and subsystems may be realized as discrete elements, the functions of the components and subsystems may also be realized by integrating, combining, or packaging one or more elements in any suitable fashion. The mobile device 201 includes a controller comprising at least one processor 240 (such as a microprocessor) which controls the overall operation of the mobile device 201. The processor 240 interacts with device subsystems such as a wireless communication subsystem 211 for exchanging radio frequency signals with the wireless network 101 to perform communication functions. The processor 240 interacts with additional device subsystems including a display 204 such as a liquid crystal display (LCD) screen or any other appropriate display, input devices 206 such as a keyboard and control buttons, persistent memory 244, random access memory (RAM) 246, read only memory (ROM) 248, auxiliary input/output (I/O) subsystems 250, data port 252 such as a conventional serial data port or a Universal Serial Bus (USB) data port, speaker 256, microphone 258, short-range communication subsystem 262 (which may employ any appropriate a wireless (e.g., RF), optical, or other short range communications technology), and other device subsystems generally designated as 264. Some of the subsystems shown in FIG. 2 perform communication-related functions, whereas other subsystems may provide "resident" or on-device functions.

Display 204 may be realized as a touch-screen display in some embodiments. The touch-screen display may be constructed using a touch-sensitive input surface connected to an electronic controller and which overlays the visible element of display 204. The touch-sensitive overlay and the electronic controller provide a touch-sensitive input device and the processor 240 interacts with the touch-sensitive overlay via the electronic controller.

The wireless communication subsystem 211 includes one or more communication systems for communicating with wireless WAN base stations 108 and wireless LAN access points 114 within the wireless network 101. The particular design of the wireless communication subsystem 211 depends on the wireless network 101 in which mobile device 201 is intended to operate. The mobile device 201 may send and receive communication signals over the wireless network 101 after the required network registration or activation procedures have been completed.

The processor 240 operates under stored program control and executes software modules 221 stored in memory such as persistent memory 244 or ROM 248. ROM 248 may contain data, program instructions or both. Persistent memory 244 may contain data, program instructions or both, in some embodiments is rewritable under control of processor 240, and may be realized using any appropriate persistent memory technology, including EEPROM, EAROM, FLASH, and the like. As illustrated in FIG. 2, the software modules 221 comprise operating system software 223 and software applications 225.

Software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

The software applications 225 may further include a range of applications, including, for example, an e-mail messaging application, address book, calendar application, notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display 204) according to the application.

In some embodiments, the auxiliary input/output (I/O) subsystems 250 may comprise an external communication link or interface, for example, an Ethernet connection. The auxiliary I/O subsystems 250 may further comprise one or more input devices, including a pointing or navigational tool such as a clickable trackball or scroll wheel or thumbwheel, or one or more output devices, including a mechanical transducer such as a vibrator for providing vibratory notifications in response to various events on the mobile device 201 (e.g., receipt of an electronic message or incoming phone call), or for other purposes such as haptic feedback (touch feedback).

In some embodiments, the mobile device 201 also includes one or more removable memory modules 230 (typically comprising FLASH memory) and one ore more memory module interfaces 232. Among possible functions of the removable memory module 230 is to store information used to identify or authenticate a user or the user's account to wireless network 101. For example, in conjunction with certain types of wireless networks, including GSM and successor networks, the removable memory module 230 is referred to as a Subscriber Identity Module or SIM. The memory module 230 is inserted in or connected to the memory module interface 232 of the mobile device 201 in order to operate in conjunction with the wireless network 101.

The mobile device 201 stores data 227 in a persistent memory 244. In various embodiments, the data 227 includes service data comprising information required by the mobile device 201 to establish and maintain communication with the wireless network 101.

The mobile device 201 also includes a battery 238 which furnishes energy for operating the mobile device 201. The battery may be coupled to the electrical circuitry of mobile device 201 through a battery interface 236, which may manage such functions as charging the battery from an external power source (not shown) and the distribution of energy to various loads within or connected to the mobile device 201. Short-range communication subsystem 262 is an additional optional component which provides for communication between the mobile device 201 and different systems or devices, which need not necessarily be similar devices. For example, the short-range communication subsystem 262 may include an infrared device and associated circuits and components, or a wireless bus protocol compliant communication mechanism such as a BLUETOOTH communication module to provide for communication with similarly-enabled systems and devices.

A predetermined set of applications that control basic device operations, including data and possibly voice communication applications will normally be installed on the mobile device 201 during or after manufacture. Additional applications and/or upgrades to the operating system software 223 or software applications 225 may also be loaded onto the mobile device 201 through the wireless network 101, the auxiliary I/O subsystem 250, the data port 252, the short-range communication subsystem 262, or other suitable subsystem such as 264. The downloaded programs or code modules may be permanently installed, for example, written into the program memory (e.g. the persistent memory 244), or written into and executed from the RAM 246 for execution by the processor 240 at runtime.

The mobile device 201 may provide two principal modes of communication: a data communication mode and an optional voice communication mode. In the data communication mode, a received data signal such as a text message, an e-mail message, Web page download, or an image file will be processed by the wireless communication subsystem 211 and input to the processor 240 for further processing. For example, a downloaded Web page may be further processed by a browser application or an e-mail message may be processed by an e-mail message messaging application and output to the display 204. A user of the mobile device 201 may also compose data items, such as e-mail messages, for example, using the input devices in conjunction with the display 204. These composed items may be transmitted through the wireless communication subsystem 211 over the wireless network 101. In the voice communication mode, the mobile device 201 provides telephony functions and operates as a typical cellular phone.

A data item managing system and method in accordance with example embodiments will now be described in detail. Referring again to FIG. 1, the wireless connector system 120 allows the mobile devices 201 to access the network 124 and connected resources and one or more remote services 144. Such services 144 may include a messaging server 132, for example, a Microsoft EXCHANGE, IBM LOTUS DOMINO, or Novell GROUPWISE e-mail messaging server. Such a messaging server 132 may sometimes be referred to as an enterprise server. Some messaging servers provide services that are not strictly limited to messaging, including services that support applications related to managing contact information, calendaring, and the like. Some such messaging servers are also referred to as "groupware" servers, and the related applications are sometimes referred to as "Personal Information Management" or PIM applications. The services 144 may also include one or more Internet servers 140. Each Internet server 140 may include an application server for implementing server-based applications such as instant messaging (IM) applications, e-mail (such as web-based e-mail), voice mails, appointments, task items, and calendar events. Each Internet server 140 may also include a content server for providing content such as internet content or content from an organization's internal servers to the mobile devices 201 in the wireless network 101. The one or more services 144 may also include one or more other servers 142, to perform similar functions or applications as the messaging server 132 or Internet servers 140, and which may or may not be Internet-based. Although services 144 are depicted in FIG. 1 as implemented via discrete servers, the services may be distributed or integrated over any appropriate number and topology of servers.

The wireless network gateway 110 is configured to send data packets received from the mobile device 201 over the WWAN 102 to the wireless connector system 120. The wireless connector system 120 then sends the data packets to the appropriate connection point such as the messaging server 132, Internet servers 140, or other servers 142. Conversely, the wireless connector system 120 sends data packets received, for example, from the messaging server 132, the Internet server 140, or the other servers 142 to the wireless network gateway 110 which then transmits the data packets to the destination mobile device 201. The AP interfaces 116 of the WLAN 104 provide similar sending functions between the mobile device 201, the wireless connector system 120 and network connection point such as the messaging server 132, the Internet server 140, and the other servers 142. In further example embodiments, a user may concurrently or alternatively access the services 144 through computer 117.

Figure 3:
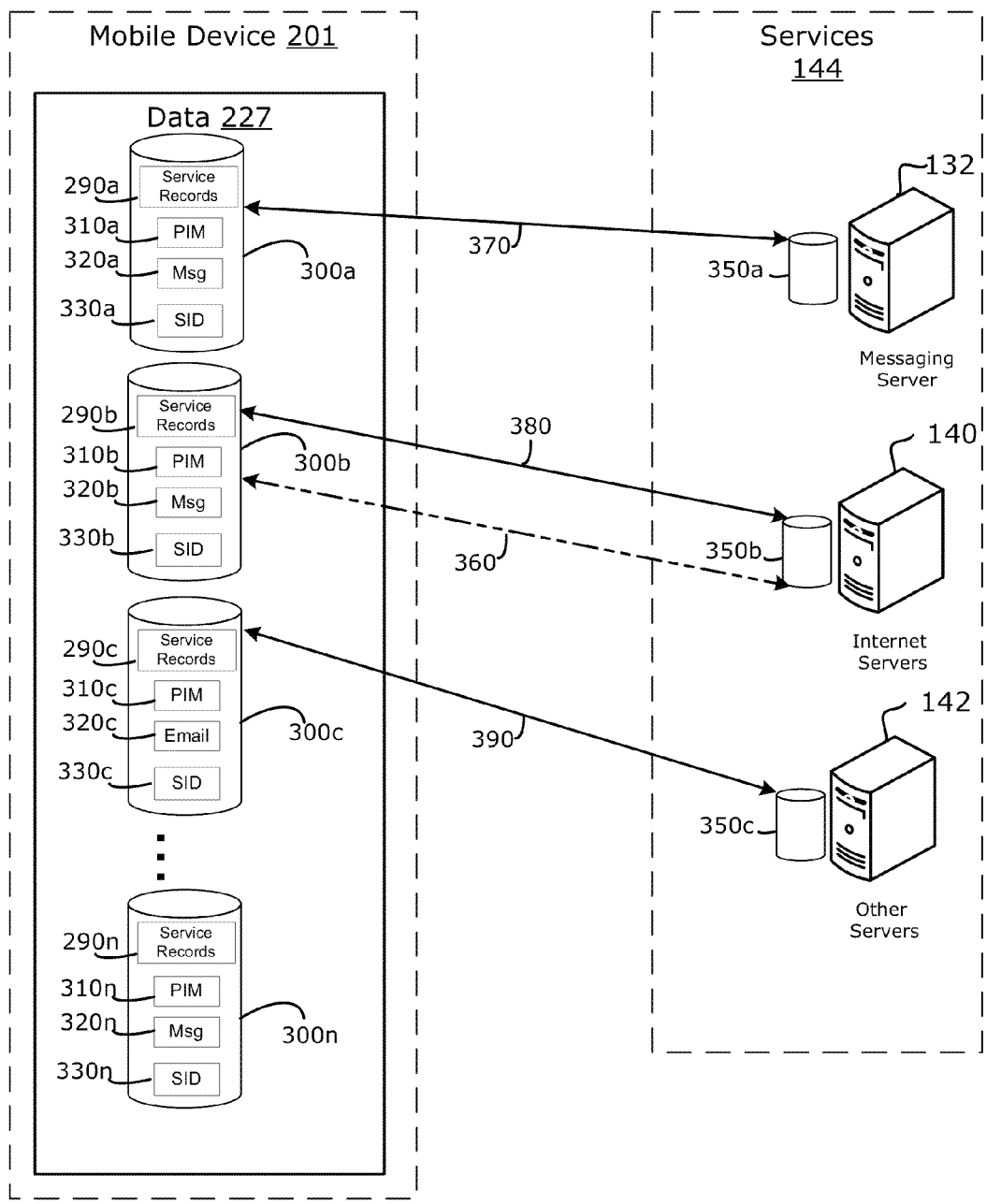
FIG. 3 shows a detail block diagram illustrating communication of data items between the mobile communication device of FIG. 2 and the remote services of the communication system of FIG. 1.

Referring now to FIGS. 2 and 3, in order to communicate with the services 144, service information, for example service records 290, are sent from the service 144 to the mobile device 201 and stored in memory of the mobile device 201. Such service records 290 may include or relate to various application protocols which may be used to transport data from and to the services 144 depending on the particular application. Non-limited examples of such protocols include a MIME (Multipurpose Internet Mail Extensions) protocol, or a compressed derivative, for transporting messages such as e-mail messages, an over the air (e-mail) folder management protocol, an ICAL protocol for calendar data, or a compressed derivative, and known synchronization protocols for personal information management (PIM) and backup/restore data. Backup/restore data includes data such as device options, options for individual applications, etc. Other protocols may be used, as appropriate and depending on the particular application.

Referring still to FIG. 2, in an example embodiment, at least some of the software applications 225 may function as personal information management (PIM) applications 272. Such PIM applications 272 may be configured to include the ability to organize and manage a collection of data items relating to a user or mobile device 201 such as, but not limited to, address book or contact information, calendar events, appointments, and task items. Thus, the PIM applications 272 may in fact be part of other applications which for example also manage instant messaging, e-mail and voice mail data handling functions, and the data 227 may also include user application data such as e-mail messages, instant messaging messages, and other user information stored on the mobile device 201 by its user.

Reference is now made to FIG. 3, which shows in greater detail the relationship between the mobile device 201 and the one or more services 144. The data 227 is stored in the persistent memory 244 (FIG. 2) of the mobile device 201 and may be organized, at least partially, into a number of data persistent databases 300a, 300b, 300c, . . . , 300n. Each of the databases 300a, . . . 300n may contain a collection of data items associated with a specific one of services 144. As shown, each of the databases 300 may include, for example, associated service records 290, PIM data 310, messaging data 320 (which may include, e.g., e-mail messages, instant messaging messages, and short-message-service (SMS) messages), and Service Identifiers (SID) 330. Thus, a collection of service records 290, PIM data 310, messaging data 320, and Service Identifiers (SID) 330 associated with a specific one of services 144 are stored within one of the individual databases 300 associated with that specific service.

Although each PIM collection 310a, 310b, 310c . . . , 310n is shown as a single collection, it can be appreciated that each collection 310a, 310b, 310c, . . . , 310n may in fact represent a plurality of collections. In some example embodiments, each collection 310a, 310b, 310c, . . . , 310n may for example include upwards of 40 to 50 collections of data items.

The messaging server 132, Internet servers 140, and other servers 142 may perform applications having common functions, for example address book or calendar functions, depending on the service information contained in the service records 290. A difficulty arises in some conventional mobile devices, wherein a single database would be used within the mobile device to store a specified collection of data items within a common category of information, such as PIM information. This may lead to difficulties should more than one of these servers attempt to access the same data items. An undesired result may be cross-pollination of data items having common categories of information between various ones of services 144 upon synchronization.

Referring to FIGS. 2 and 3, the PIM applications 272 may allow each database 300 to be viewed individually. In other example embodiments, the PIM application 272 may organize these databases 300 for viewing purposes into a collective group (while internally maintaining the distinction between the different databases 300). For example, corporate enterprise contacts and Internet personal contacts may be viewable on the display 204 as separate listings, or as a collective group, depending on the particular configuration of the mobile device 201 and the applications available thereon.

One or all of the databases 300 may be implemented as relational databases, defined in terms of tables and records populated with data. Relations between data items in the databases 300 may for example be user defined, or may be defined according to the needs of the applications available on mobile device 201. The relations for example may be of a form acceptable to Structured Query Language (SQL). The databases 300 are alternatively of other database management system types or, more generally, of any of various data constructions.

In some example embodiments, the PIM application 272 is further configured to synchronize, integrate, and/or update with a corresponding service 144 over the wireless network 101 or using the computer 117 (e.g., using a desktop cradle, not shown). In such embodiments, this for example includes one of the databases 300 having some or all of the data items synchronized with related data items of the associated service 144. For example, one or more data items may be changed, added, or deleted in either the mobile device 201 or the service 144. Example implementations include various types of synchronizations, for example total synchronization wherein all data items are mirrored, deletion only synchronization wherein only deleted items from one device are synchronized, additional only synchronization wherein only added items from one device are synchronized, one-way synchronization, and suitable combinations, partial combinations and sub-combinations of these synchronization types, depending on the particular application or configuration. Suitable algorithms and methods may also be used to resolve conflicts, for example when a data item has been modified in both the mobile device 201 and the service 144, as would be understood by those skilled in the art.

Synchronization may be performed automatically, for example, after or as a result of a change which has been made to a data item within one of the databases 300 or one of the servers 144. In other example embodiments, the mobile device 201 may be configured to permit manual synchronization, wherein a user selects an appropriate command from a user interface (not shown) displayed on the mobile device 201 to initiate synchronization. Synchronization may also be triggered upon passage of a predetermined time or expiration of a timer or counter. Other triggers for synchronization may be used, as understood by those skilled in the art.

Referring still to FIG. 3, a specific example of an association will be described as between the mobile device 201 and particular services 144. By way of example only, as shown by arrow 370, database 300a may be activated, associated and synchronized with an enterprise database 350a in the messaging server 132. Similarly, as shown by arrow 380, database 300b may be activated, associated and synchronized with an Internet database 350b in an Internet server 140. Database 300c may be activated, associated and synchronized with other database 350c in other server 142, as shown by arrow 390.

In some example embodiments, referring still to FIG. 3, generally a mobile device 201 may be removed or deactivated from one of the services 144. By way of example only, as indicated by dashed arrow 360, service of the mobile device 201 is deactivated from the Internet server 140. This includes the Internet server 140 no longer permitting the mobile device 201 to access the particular service. Accordingly, database 300b may no longer be synchronized with Internet database 350b, and in some embodiments the service records 290b are deleted within the mobile device 201. In example embodiments, the mobile device 201 in doing so maintains (e.g., by not deleting) the database 300b and maintains the SID 330b, even though the service from the Internet server 140 has been removed.

Specific implementations of such a process in accordance with example embodiments will now be described, referring now to FIG. 4, which shows a flow diagram 400 of communications as between the mobile device 201 and one of the services 144. In the example shown, a specific database 300 is associated with a specific service 144. Generally, an association with the service 144 is maintained when the service 144 is removed from the mobile device 201. Steps 410, 420, 440, 450, 460 relate to the activation of the service 144 and generating a SID to associate the database 300 with the service 144. Steps 460, 470, 490, 500 relate to the removal of the service 144 while maintaining the association with the service 144 by maintaining the database 300 and the SID. Steps 510, 520, 530, 540 and 550 relate to reactivating of the service 144, and re-associating of the database 300 to the service 144 using the SID. Although the flow diagram 400 is primarily described from the perspective of the mobile device 201, it can be appreciated that the service 144 may perform additional functions not described herein, as would be understood to those skilled in the art.

Figure 4:
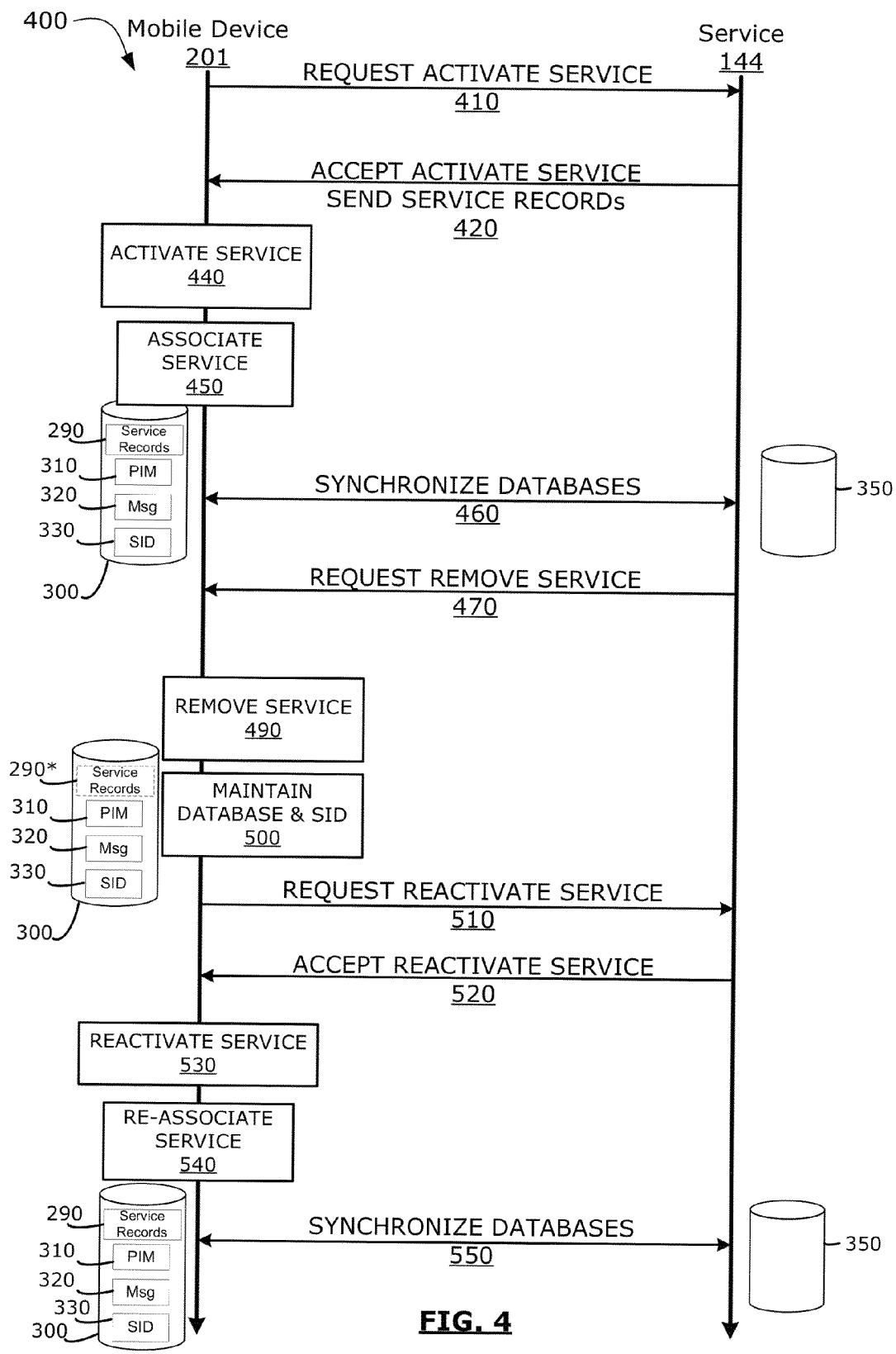
FIG. 4 shows a flow diagram of a conversation between the mobile communication device and one of the remote services in accordance with an example embodiment.

Referring still to FIG. 4, at step 410, the mobile device 201 sends a request to the service 144 to activate the mobile device 201 within that specific service. As an alternative, in some example embodiments, the service 144 rather than the mobile device 201 may initiate the activation of the mobile device 201 within the service 144. The request step 410 may further include the mobile device 201 sending user information (such as a login or an e-mail address) and password information. At step 420, the service 144 accepts (or rejects) the request of step 410, which may include authenticating the user information and password information. Still referring to step 420, after authenticating the mobile device 201, the service 144 sends service information, for example, service records 290, to the mobile device 201. Typically, the sending of service records 290 at step 420 involves multiple service records which may include records of various types or employing various protocols, including but not limited to a MIME, an ICAL, known synchronization protocols, etc. The service records 290 therefore relate to service information for configuration of applications which include PIM, e-mail, calendar, etc., for communicating with the particular service 144.

An example service record includes the following fields, which may be required or optional depending on the needs of the particular embodiments. In an example embodiment, required fields may include Service Name, Service UID, Content Identifier, and Certificate Authority Realm, and optional fields may include account address, home address, network level address, application data, compression mode, encryption mode, acknowledgement data structure, Service gateway key data, host routing data structure, current host routing information, record source, service description, data source id (DSID), BBR routing information, user id (USID), service source id, and record type. Other required and optional fields may be appropriate for other embodiments. As can be appreciated, in some embodiments, a relatively large amount of service configuration information may be communicated and implemented from each service record. In some example embodiments, the mobile device 201 is configured to extract information from the following fields from service records 390 in order to generate a Service ID (SID): Service UID (SRP ID of the server), Content Identifier, data source id (DSID), and user id (USID). The generation of the SID is described further with respect to step 440.

At step 440, the requested service 144 is activated in the mobile device 201. Reference to "activated" includes the service 144 having authenticated the mobile device 201 and the mobile device 201 having received the service records 290 for operation of the specified applications of the service 144. In some embodiments, the mobile device 201 is already enabled to function with the service 144, and thus merely requires configuration of server-specific parameters to complete this step (for example, using the received service records 290). In other example embodiments, the mobile device 201 must install or receive service-specific applications in order to function with the service 144. This may for example include the mobile device 201 downloading one or more additional applications over the wireless network 101 (FIG. 1). In some example embodiments, the service 144 is a subscription-based service and the activating step 440 includes subscribing to the service.

Referring still to step 440, those service records which were sent by the service 144 (at step 420) are stored by the mobile device 201 as service records 290 and used to generate the SID, representing the identification of that particular service. In some example embodiments, the SID is generated as a composite hash of a number of identifiers from the received service records 290. For example, the SID may be formed as a 64-bit field from information extracted or obtained from service records as follows:

Bits (inclusive):
0-31, 32 bit hash of the user id (USID)
32-47, 16 bit hash of the data source id (DSID)
48-63, 16 bit hash of the UID (SRP ID of the server).

It is recognized herein that such a SID provides a single unique identifier which can be used to reference the service 144. Moreover, the SID includes some information identifying the mobile device 201 (e.g., the USID). Such a SID also allows the mobile device 201 to readily determine whether a database 300 is associated with the proper service 144. For example, the mobile device 201 may be configured to determine that SIDs (and in turn, services 144) are considered properly associated. An SID properly matches when; a) the SID matches a reference SID exactly or b) any two of the three hashes in the SID are the same as a reference SID.

Still referring to FIG. 4, at step 450, the mobile device 201 establishes an association with the service 144. This includes the mobile device 201 storing the generated SID of the service 144 into memory, for example within database 300 as SID 330, as shown. Accordingly, the mobile device 201 is configured to associate the proper database 300 with the service 144 using the SID 330. It can be appreciated that in some embodiments the service 144 is generally unaware that the association and SID was created by the mobile device 201 for maintaining of the database 300.

At this stage, the mobile device 201 and the service 144 may operate in the ordinary course to perform the functions of the service 144. For example, if the service 144 includes an Internet e-mail server, this may include the e-mail server (or associated gateway) pushing e-mails to the mobile device 201. If the service 144 includes a calendar application, this may include using the mobile device 201 for adding or modifying calendar events, inviting attendees, etc. Referring now to step 460, the mobile device 201 and the service 144 perform synchronization, either manually or automatically, as described above. This provides that at least some of the data items in the database 300 are synchronized with the database 350 associated with the service 144. Although only one step 460 is shown, it can be appreciated that multiple synchronizations could occur at this stage. In some example embodiments, PIM data items are communicated using suitable synchronization protocols, as would be understood by those skilled in the art.

Removal of the service 144 will now be described, which generally provides that the mobile device 201 no longer has access to the service 144, and in turn the mobile device 201 removes the service records 290 (while maintaining the SID 330). At step 470, the service 144 may notify the mobile device 201 that the service has been removed (e.g., the mobile device 201 no longer has access to the service 144), for example by sending a remove service command. In other example embodiments, the mobile device 201 merely removes the service from the mobile device 201 (e.g., by deleting the service records 290), while the service 144 may be unaware that the service was removed. In such an instance there is no interaction between the mobile device 201 and the service 144. In other example embodiments, the mobile device 201 sends a notification and/or request to the service 144 that the service 144 is to be removed. At step 490, the mobile device 201 also removes the service 144, for example by deleting the service records 290* (dashed outline representing deletion of the service records 290, as shown in FIG. 4), while maintaining the SID 330 as well as the remaining PIM 310 and messages 320 of the database 300. This may also include the mobile device 201 removing the configuration of server-specific parameters based on the service records 290. In some example embodiments, the mobile device 201 further un-installs or deletes service-specific applications in order to remove the service 144.

Referring now to step 500, concurrent with or after step 490, the mobile device 201 maintains (e.g. does not remove) the database 300, as well as the SID 330. Step 500 may further include "orphaning" of the database 300, which includes removing access to the database 300 from applications operating on the mobile device 201, for example other applications which may inadvertently access data items within the database 300. As the database 300 may not be accessible by applications or the user, the user may have an impression that the database 300 was removed from the mobile device 201 and be unaware that the database 300 has in fact been orphaned for future use upon reactivation of the service 144.

Referring briefly to FIG. 3, in the maintaining step 500, in some embodiments a database (e.g. 300b) associated with a removed service (e.g. Internet server 140) may be shown as a "combined" view with another database (e.g. 300a), at least from the point of view from the user or an application accessing the database 300a on the mobile device 201, until the service 144 becomes reactivated. The databases 300a, 300b would still be internally distinguished within the mobile device 201.

Re-activating the service 144 will now be described, referring again to FIG. 4, which again generally includes the service 144 authenticating the mobile device 201 and the mobile device 201 receiving service records 290. At step 510, the mobile device 201 requests that the service 144 be reactivated. At step 520, the service 144 accepts the request. In step 520, the service 144 may once again send the service records 290 to the mobile device 201 (consistent with the normal operation of the service 144). However, in contrast to the operation at step 420, at step 520 it is not required that the service records 290 be re-processed by the mobile device 201 to generate the SID. For example, because the SID was earlier generated for this service, and has been maintained within the mobile device 201 despite the subsequent removal of the service, it is not necessary to generate the SID again. At step 530, the service is reactivated, for example the service 144 has authenticated the mobile device 201, and the mobile device 201 is once again configured using the received service records 290 for communication with the service 144.

At step 540, the service 144 is re-associated with the mobile device 201. This includes the mobile device 201 using the SID 330 of the service 144 already stored in persistent memory 244 (FIG. 2). Accordingly, the mobile device 201 is able to identify the proper maintained database 300 to be associated with the service 144 using the SID 330. This was made possible because the database 300 was maintained at step 500.

At step 550, the database 300 of the mobile device 201 and the database 350 of the service 144 may synchronize, to account for any changes that had occurred while the service 144 was removed. Because the database 300 was maintained in the mobile device 201, synchronization may not be required for every data item, which may for example assist in reducing traffic over the wireless network 101 (FIG. 1).

Referring still to step 550, the mobile device 201 and the service 144 may once again operate in the ordinary course, which may include additional synchronizations.

It can be appreciated that in some example embodiments only the mobile device 201 need be configured to implement aspects of the above-described embodiments. Thus, in such embodiments existing services 144 may not require modification, and may in fact be unaware of any such implementations of the mobile device 201.

Variations of the method of flow diagram 400 may be used. In some example embodiments, after step 470 the service 144 may in fact delete the corresponding database 350 from the associated server. Thus, the database 300 in the mobile device 201 may be the only remaining data collection relating to the data items contained therein. As a result, during the synchronizing step 550, the mobile device 201 may re-synchronize with the service 144 to send those data items which were maintained within the database 300.

It can be appreciated that some steps of the flow diagram 400 may be performed by the computer 117 (FIG. 1). For example, at step 470 the request to remove the service 144 may be made by the computer 117 (FIG. 1), while the remaining steps are performed over the wireless network 101 from or to the mobile device 201.

While the operations of the flow diagram 400 have been described as occurring in a particular order, it will be appreciated to persons skilled in the art that some of the steps may be performed in a different order provided that the result of the changed order of any given step will not prevent or impair the occurrence of subsequent steps. Furthermore, some of the steps described above may be removed or combined in other embodiments, and some of the steps described above may be separated into a number of sub-steps in other embodiments. Even further, some or all of the steps of the flow diagram 400 may be repeated, as necessary.

In accordance with some example embodiments, there is generally provided methods and devices for maintaining data collections within a mobile device when an associated service is removed. A service identifier is generated from received service information relating to the service, the service identifier representing the association with the service. The service identifier retains information about the service such that if the service is reactivated on the device the maintained collection will become re-associated with the service by using the service identifier.

In accordance with another example embodiment, there is provided a method of managing data items within a mobile communication device. The data items are organized into a plurality of data collections stored in a storage of the mobile communication device, the mobile communication device being in communication with a remote service over a wireless network, and one collection in the plurality of collections being in association with the remote service. The method includes: receiving service information relating to the remote service, generating an identifier representing the association using the received service information, removing the remote service from the mobile communication device, and maintaining the collection and the identifier within the storage.

In accordance with another example embodiment, there is provided a mobile communication device, which includes a controller for controlling the operation of the device, a communication subsystem connected to the controller configured for data communication with a remote service over a wireless network, and a storage for storage of data items, the data items being organized into a plurality of data collections stored in the storage, one collection in the plurality of collections being in association with the remote service. The controller is configured for receiving service information relating to the remote service, generating an identifier representing the association using the received service information, removing the remote service from the mobile communication device, and maintaining the collection and the identifier within the storage.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

While some of the present embodiments are described in terms of methods, a person of ordinary skill in the art will understand that present embodiments are also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present example embodiments.

Certain adaptations and modifications of the described embodiments can be made. Therefore, the above discussed embodiments are considered to be illustrative and not restrictive.

What is claimed is:

1. A method of managing data items within a mobile communication device, the data items being organized into a plurality of data collections stored in a storage of the mobile communication device, the mobile communication device being in communication with a remote service of a server over a wireless network, one collection in the plurality of collections being in association with the remote service, the method comprising:
   receiving service information relating to the remote service from the server;
   storing the received service information in the storage;
   generating an identifier representing the association using the received service information;
   removing the remote service from the mobile communication device including deleting the service information from the storage; and
   maintaining the collection and the identifier within the storage when the remote service is removed.

2. A method as claimed in claim 1, further including the step of removing access to the collection from applications operating on the mobile communication device.

3. A method as claimed in claim 1, further comprising:
   reactivating the remote service to the mobile communication device; and
   re-associating the collection with the remote service using the identifier.

4. A method as claimed in claim 3, further comprising, after re-associating, synchronizing at least some of the data items in the maintained collection with the server associated with the remote service.

5. A method as claimed in claim 1, wherein the storage includes a second collection in the plurality of collections being in association with a second remote service of a second server.

6. A method as claimed in claim 5, wherein data items include categorization within categories of information, and wherein the remote services include applications having common functions as between the remote services and wherein such applications access data items within common categories of information.

7. A method as claimed in claim 6, wherein data items are organized into the plurality of collections based on association with one of the remote services independent of the particular category of information.

8. A method as claimed in claim 7, wherein the categories of information include information relating to personal information.

9. A method as claimed in claim 1, wherein the service information includes service records, and the step of generating includes extracting specified information from the service records.

10. A method as claimed in claim 1, wherein the storage is a persistent memory and the collection stored therein is a data persistent database.

11. A method as claimed in claim 1, wherein the identifier is generated from hashing at least one of an identifier of a user, an identifier of a data source, and an identifier of the remote service.

12. A mobile communication device, comprising:
   a controller for controlling the operation of the device;
   a communication subsystem connected to the controller configured for data communication with a remote service of a server over a wireless network;
   a storage for storage of data items, the data items being organized into a plurality of data collections stored in the storage, one collection in the plurality of collections being in association with the remote service;
   the controller being configured for receiving service information relating to the remote service from the server, storing the received service information in the storage, generating an identifier representing the association using the received service information, removing the remote service from the mobile communication device including deleting the service information from the storage, and maintaining the collection and the identifier within the storage when the remote service is removed.

13. A mobile communication device as claimed in claim 12, wherein the controller is further configured for removing access to the collection from applications operating on the mobile communication device.

14. A mobile communication device as claimed in claim 12, wherein the controller is further configured for:
   reactivating the remote service to the mobile communication device; and
   re-associating the collection with the service using the identifier.

15. A mobile communication device as claimed in claim 14, wherein the controller is further configured for, after re-associating, synchronizing at least some of the data items in the maintained collection with the server associated with the remote service.

16. A mobile communication device as claimed in claim 12, wherein data items include categorization within categories of information, and wherein the remote services include applications having common functions as between the remote services and wherein such applications access data items within common categories of information.

17. A mobile communication device as claimed in claim 12, wherein the storage includes a second collection in the plurality of collections being in association with a second remote service of a second server.

18. A mobile communication device as claimed in claim 17, wherein data items are organized into the plurality of collections based on association with one of the services independent of the particular category of information.

19. A mobile communication device as claimed in claim 18, wherein the categories of information include information relating to personal information.

20. A mobile communication device as claimed in claim 12, wherein the storage is a persistent memory and the collection stored therein is a data persistent database.

21. A mobile communication device as claimed in claim 12, wherein the identifier is generated from hashing at least one of an identifier of a user, an identifier of a data source, and an identifier of the remote service.

22. A mobile communication device as claimed in claim 12, wherein the mobile communication device is a handheld device.

23. A method as claimed in claim 5, further comprising displaying, when the remote service is removed, a combined view of data from the maintained collection and data from the second collection of the plurality of data collections.

* * * * *